Sept. 3, 1957    J. V. FIDD    2,805,056
SURFACE HARDENING MACHINE
Filed March 31, 1955    6 Sheets-Sheet 1

INVENTOR.
JOSEPH V. FIDD
BY
Richard W. Treverton
ATTORNEY

INVENTOR.
JOSEPH V. FIDD
BY
Richard W. Treverton
ATTORNEY

Sept. 3, 1957 J. V. FIDD 2,805,056
SURFACE HARDENING MACHINE
Filed March 31, 1955 6 Sheets-Sheet 3

INVENTOR.
JOSEPH V. FIDD
BY
Richard W. Treverton
ATTORNEY

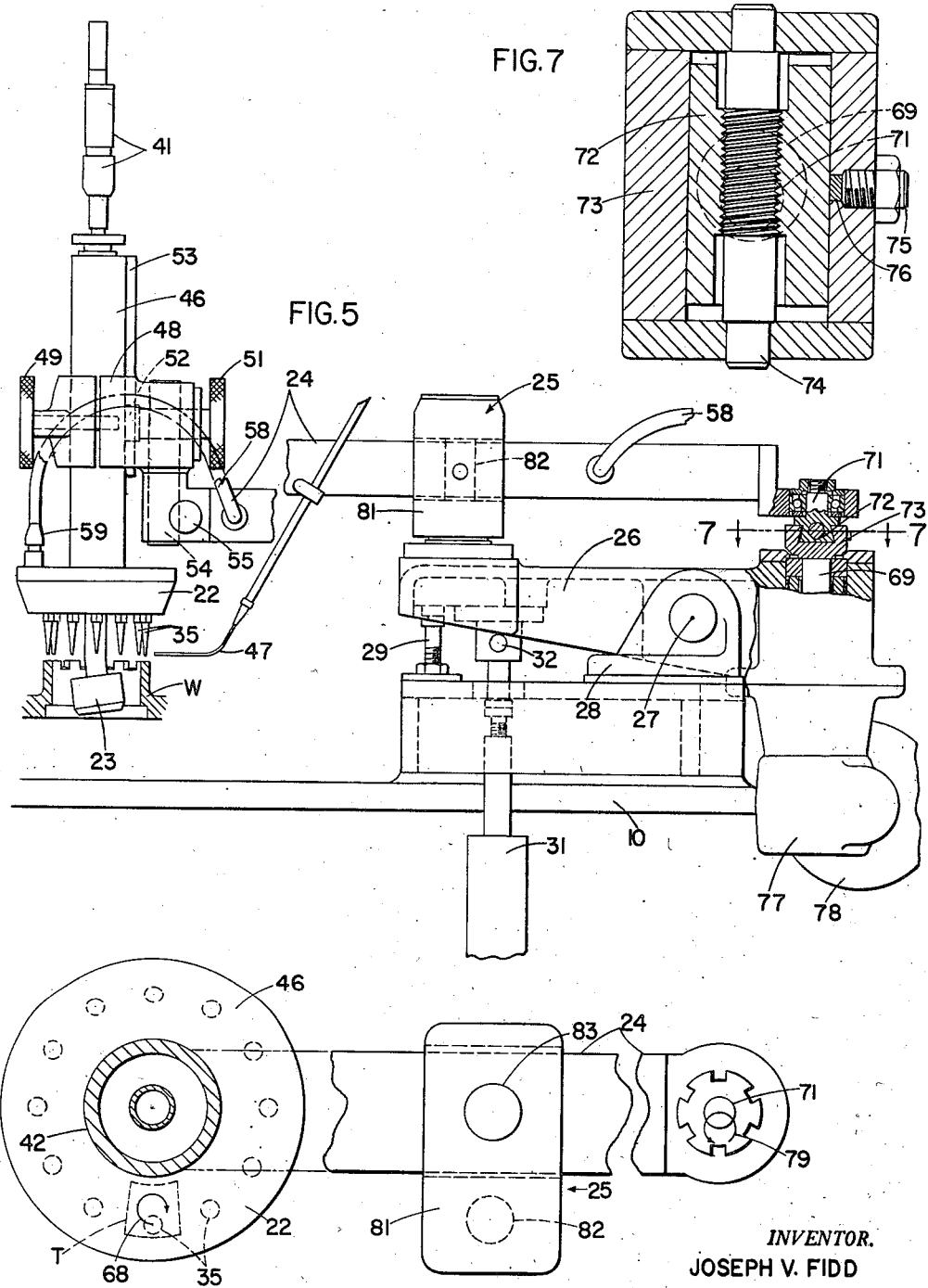

Sept. 3, 1957 J. V. FIDD 2,805,056
SURFACE HARDENING MACHINE
Filed March 31, 1955 6 Sheets-Sheet 5

INVENTOR.
JOSEPH V. FIDD
BY
*Richard W. Treverton*
ATTORNEY

Sept. 3, 1957  J. V. FIDD  2,805,056
SURFACE HARDENING MACHINE
Filed March 31, 1955  6 Sheets-Sheet 6

INVENTOR.
JOSEPH V. FIDD
BY
Richard W. Treverton
ATTORNEY

United States Patent Office 2,805,056
Patented Sept. 3, 1957

2,805,056

SURFACE HARDENING MACHINE

Joseph V. Fidd, Ontario, N. Y., assignor to The Gleason Works, Rochester, N. Y., a corporation of New York Application March 31, 1955, Serial No. 498,158

6 Claims. (Cl. 266—4)

The present invention relates to a surface hardening machine for workpieces which are subject to hardening by heating followed by quenching.

According to one aspect of the invention there is a support for a workpiece having a plurality of teeth arranged in a circle and whose tip faces lie approximately in a plane, a burner-carrying arm, a substantially ring-shaped burner on the arm in approximately parallel and concentric relation to such workpiece, said burner being provided with means for directing a jet of flame against the tip face of each of said teeth of the workpiece, and means for effecting a relative motion between the support and the arm in a plane substantially parallel to the aforementioned plane, said motion being such as to effect a relative translation of each of said jets in a closed path over the related tooth of the workpiece. Preferably the burner-carrying arm is supported on the frame of the machine by a link which is pivoted both to the frame and to the arm, and the means for effecting relative motion comprises a crank which is rotatable with respect to the frame and has its crank pin journaled in the arm.

According to another aspect of the invention a nozzle for directing quenching fluid against the workpiece is carried by the same support which carries the burner, and a means is provided for effecting a relative motion of this support and the workpiece support between a first position wherein the workpiece is heated by the burner and a second position wehrein it is quenched by spray from the nozzle. Preferably there is a turret which is rotatable on the frame of the machine and which has a plurality of workholders, and an indexing mechanism for periodically advancing the turret rotatively to successively move the workholders from a loading station to the work station and then back again to the loading station. The burner support is movable on the frame in time with the indexing action to alternately bring the burner and the nozzle into operative relation to the workpiece at the work station. Valve means for controlling the burner and the flow of quench fluid from the nozzle are also operated in time with the indexing action. The arrangement is such that in each operating cycle of the machine a workpiece is first indexed to the work station, then heated for a predetermined time by the burner while the valve means for the quench fluid is closed, then quenched for a predetermined time while the valve means for the burner is closed. After completion of this cycle the machine automatically stops. The operation of the machine may be substantially continuous, the operator merely unloading and reloading each workholder when it returns to the loading station and then restarting the machine.

The preferred embodiment of the invention is shown in the accompanying drawings, wherein:

Fig. 5 is a side elevation of the burner, the burner-carrying arm, the support therefor, and related parts;

Fig. 6 is a broken plan view of the burner and arm and related parts;

Fig. 7 is an enlarged detail sectional view taken in plane 7—7 of Fig. 5;

Figure 10:
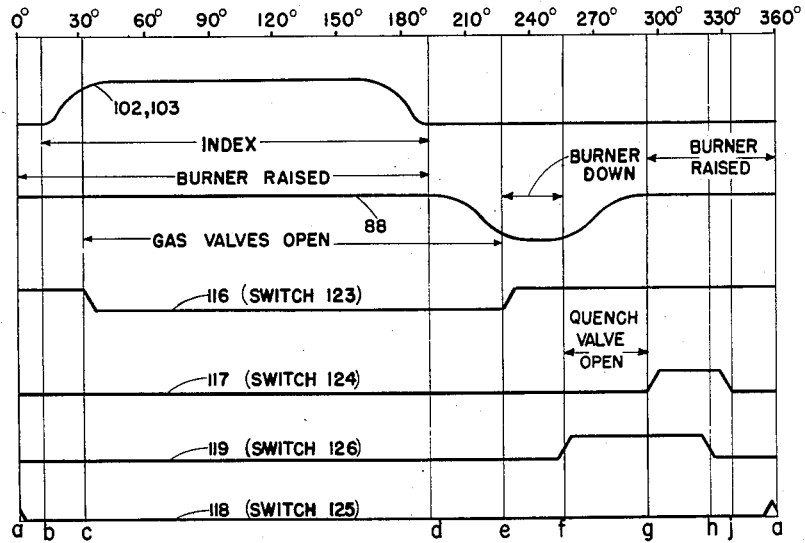

Fig. 10 a cycle diagram showing the operating sequence of the machine.

Figure 1:
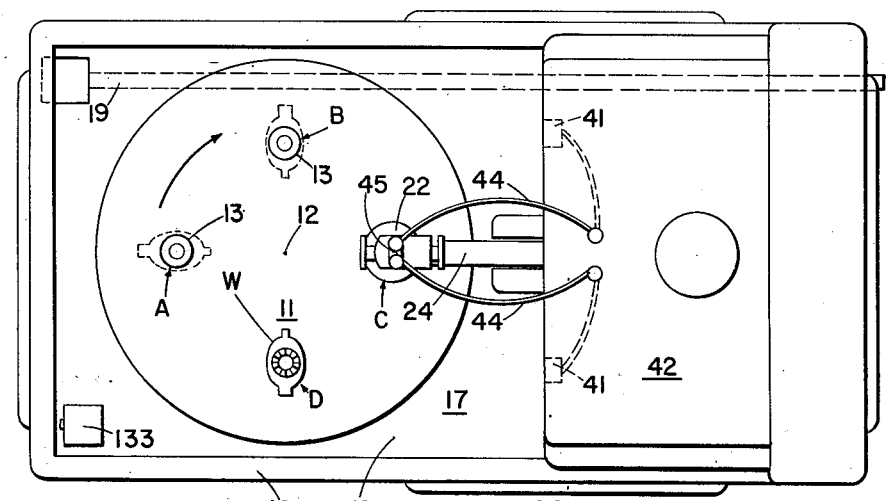
Fig. 1 is a plan view of the machine.
Figure 2:
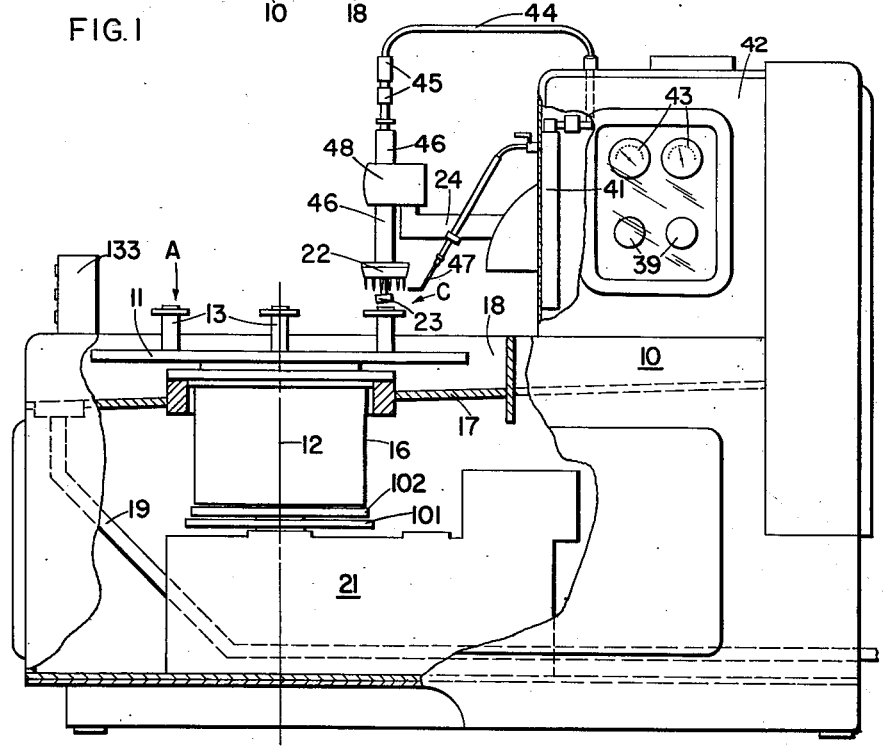
Fig. 2 is a side elevation of the machine with certain parts thereof broken away and appearing in vertical section.
Figure 4:
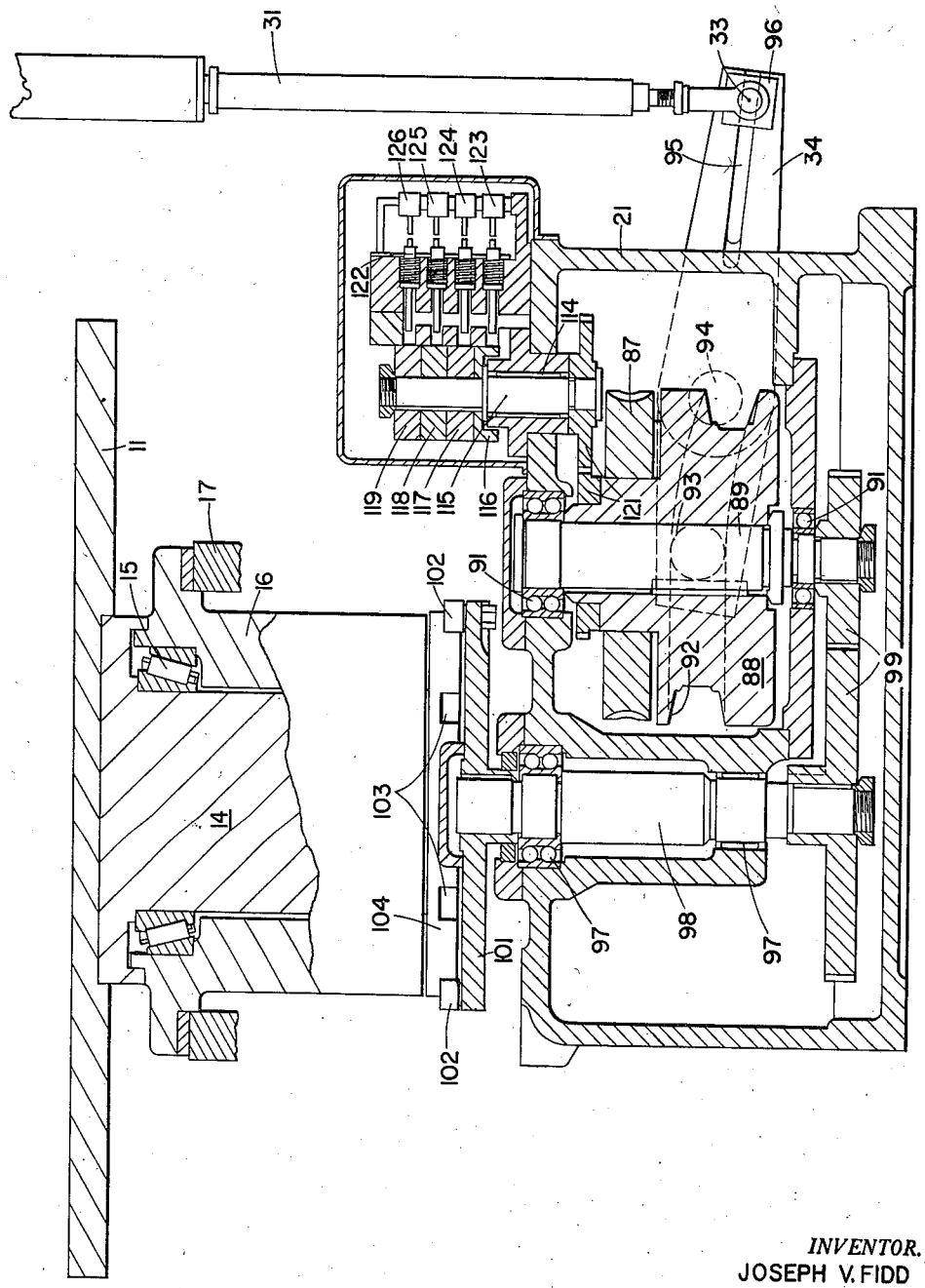
Fig. 4 is a vertical sectional view of the mechanism shown in Fig. 3.

As shown in Figs. 1 and 2 the machine comprises a frame 10 on which a work support in the form of a turret 11 is rotatable about a vertical axis 12. On the turret are four workholders 13 for workpieces W, one workholder being at loading station A, where the workholders are unloaded and reloaded, the second at idle station B, the third at work station C where the workpieces are heated and quenched, and the fourth at station D where the workpieces further cool before returning to the station A. The hub 14 of the turret, Fig. 4, is rotatable on a roller bearing 15 whose support 16 is secured to wall 17 of the frame. This wall constitutes the bottom of a basin 18 formed in the frame to collect quenching liquid, and it is slightly inclined from the horizontal to lead the fluid to a drain conduit 19. Mechanism for periodically indexing the turret through 90° is contained in a housing 21 within the frame.

Adjacent the workpiece W at work station C are a burner 22 and a quenching nozzle 23 carried by an arm 24 having a moving pivot connection 25, Figs. 5 and 6, to a burner support 26. This support in turn is pivoted about horizontal axis 27 to part 28 of frame 10, to allow it to be moved between a lowered position wherein it abuts a screw-threaded adjustable stop 29, to thereby position the burner 22 for heating the workpieces, and a raised position wherein the nozzle 23 may direct a quenching spray upon the heated face of the workpiece. Such pivotal motion of support 26 is effected by means which include a screw-threaded adjustable length link 31 that is pivoted at 32 to the support 26 and at 33 to a lever 34, Figs. 3 and 4, that is operated by the mechanism in housing 21.

The burner 22 that is illustrated is of ring-shape, corresponding to the shape of the particular workpieces W that are shown. These workpieces are face clutch members having teeth T that are to be surface hardened. The burner has a ring of nozzles 35, Fig. 8, one for each tooth T. An oxygen-acetylene mixture is supplied to the nozzles from an annular chamber 36 in the burner body. The oxygen and acetylene are supplied from sources outside of the machine, and enter separately through suitable pressure regulators (not shown) and solenoid operated valves, the oxygen control solenoid being designated at 37 in Fig. 9 and the acetylene control solenoid at 38. The system may also include valves 39, Fig. 2, for adjusting the burner flame, and flow meters 41 for maintaining metered flow of the two gases. This regulating and control equipment is mounted in a control housing 42 of the machine frame, with the flow meters so positioned as to be visible from the operator's position adjacent loading station A, at the left of the machine in Figs. 1 and 2. The equipment may further include oxygen and acetylene pressure gages 43 which are visible through a window in the housing 42. From the control devices the oxygen and acetylene pass through flexible conduits 44 to a mixing valve 45. From the latter the combustible mixture passes through a tube within tubular stem 46 of the burner 22 and thence through a radial passage in the burner body into the annular passage 36. A pilot burner 47 mounted on arm 24 receives an oxygen-acetylene mixture from the same outside sources, but is not subject to control of solenoid valves 37 and 38.

Burner stem 46 may be adjusted vertically in a clamp 48 on arm 24 by first loosening a clamp screw 49 and then turning knob 51 of a pinion 52, the pinion being rotatable in the clamp body and meshing with a rack 53 on the stem. The clamp has a pivot pin 54 which is adjustable rotatably in the arm upon first loosening a clamp screw 55. By these adjustments the burner may be brought to the desired relation to the workpiece W at work station C when the support 26 is in its lowered position.

Figure 8:
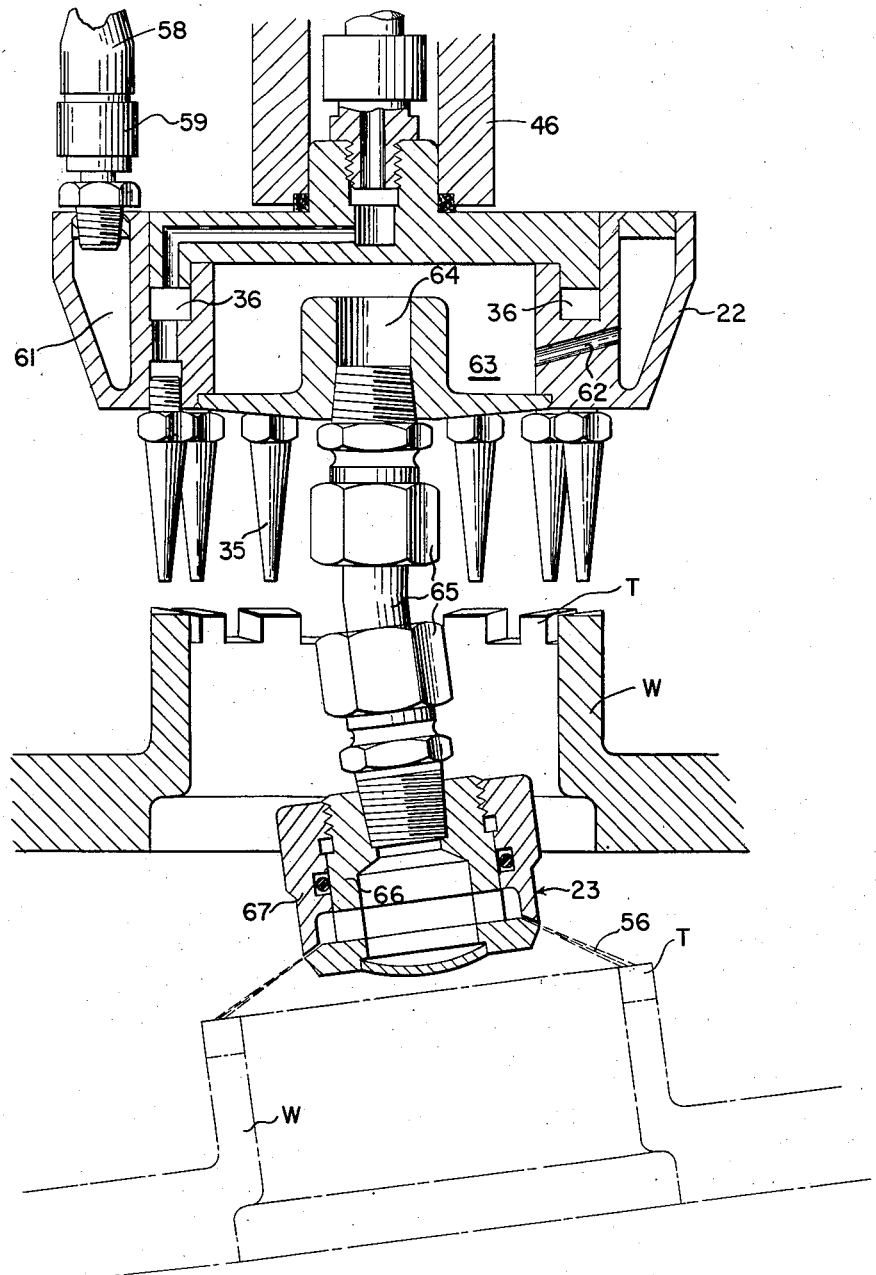
Fig. 8 is an enlarged vertical sectional view through the burner and quench nozzle, showing their relationship to a workpiece.

When the support 26 is swung about axis 27 to its raised position, its relation to the workpiece becomes that shown in Fig. 8, considering the workpiece to be in the broken-line position there appearing. In this relation the nozzle 23 is positioned to direct a spray of quenching liquid 56 upon the tops of teeth T. The quenching liquid is conducted from an outside source through suitable control means within housing 42, including a valve controlled by solenoid 57, Fig. 9, and thence through flexible conduits 58 and fittings 59 into an outer annular chamber 61 in the burner 22. From this chamber the liquid flows through passages 62, of which there are preferably several, to an inner chamber 63; and from the latter it discharges through central opening 64 and tubular fittings 65 into the nozzle 23. With this arrangement the quenching liquid also serves to cool the burner. The nozzle shown comprises a central body 66 which is connected to the burner by the fittings 65, and an outer sleeve 67 which is adjustably screw-threaded to the body to vary the size of the annular discharge orifice. The position of the nozzle relative to the workpiece can be varied by adjusting the fittings 65, which are screw-threaded together, and further, if necessary, by substituting fittings of different lengths. It will be noted that in the lowered position of the support 26 (the full line position of the workpiece in Fig. 8) the quenching nozzle extends into the central opening in the workpiece. Hence the support 26 must be raised before turret 11 can be indexed.

In order to uniformly heat the teeth T the burner 22 while in operation is given a translatory motion in a closed, substantially circular path, the motion being such that the center of the flame from each gas nozzle 35 moves over the related tooth in an approximately circular path, such as indicated at 68 in Fig. 6. This motion is imparted to arm 24 by a crank which comprises a shaft 69 journaled for rotation in support 26 and a crank pin 71 journaled in the arm 24. The eccentricity of pin 71 from shaft 69 is adjustable to vary the diameter of path 68. For this purpose the pin 71 is mounted on a slide 72, Figs. 5 and 7, that is adjustable in a crank cheek 73 that is provided on shaft 69, the adjustment being effected by turning a screw 74. After such adjustment the slide 72 is secured by means of lock-screw 75 and clamp washer 76. Crank 69, 71 is driven through a gear reduction unit 77 by a motor 78. Both the reduction unit and the motor are mounted on support 26. Rotation of the crank pin 71, in the circular path designated 79 in Fig. 6, oscillates the arm about moving fulcrum 25 to cause the afore-described translatory motion of the burner. As shown the moving fulcrum comprises a link 81 which is mounted upon anti-friction bearings on an upright pin 82 that is secured to support 26. Supported on anti-friction bearings in the link is a pin 83 which is secured to arm 24 and is parallel to pin 82.

Figure 3:
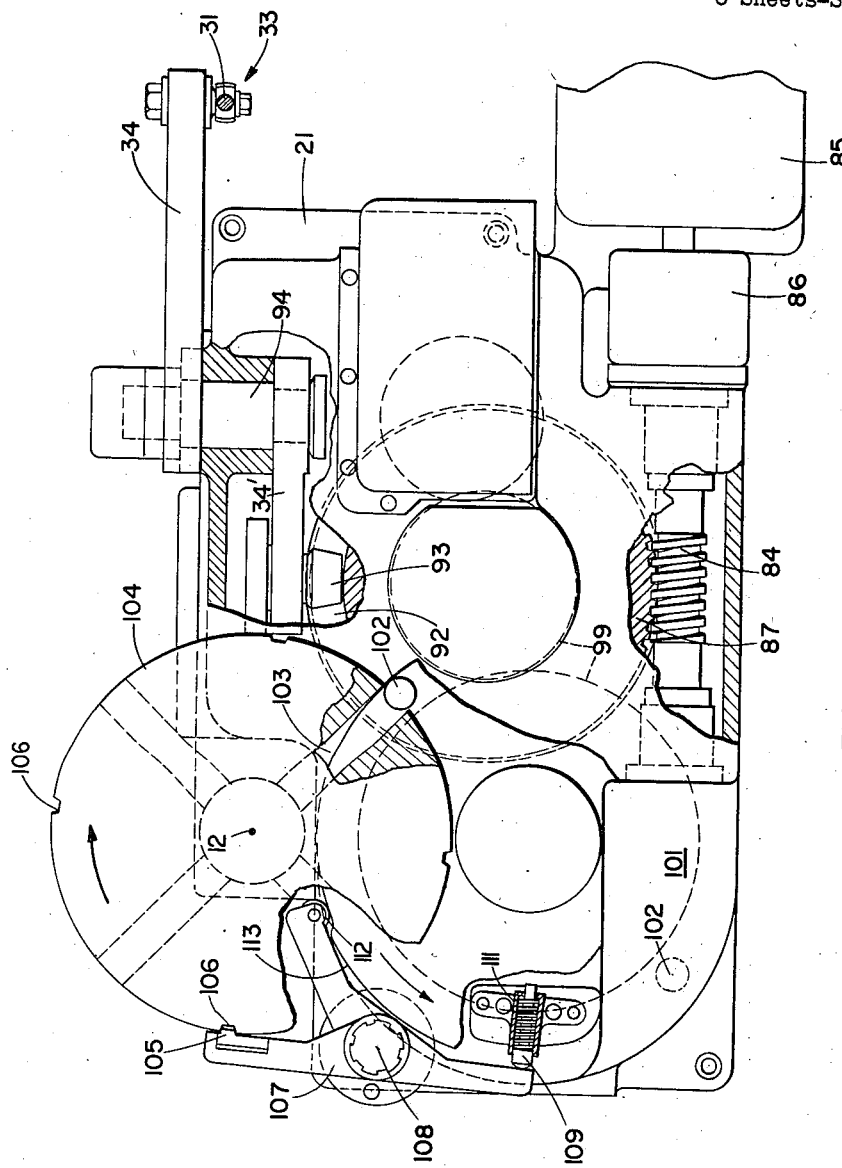
Fig. 3 is a plan view of the mechanism for indexing the turret and moving the burner support.

The mechanism in housing 21, Figs. 3 and 4, comprises a worm 84, driven by a motor 85 through a magnetic clutch and brake unit 86, and a worm wheel 87 driven by the worm. The worm wheel is secured to a cam 88 that is affixed to a vertical shaft 89 which is journaled for rotation in anti-friction bearings 91. Riding in a continuous cam track 92 on the cam is a follower roller 93 that is mounted on an arm 34' of the lever 34. The lever has a journal portion 94 extending through a bearing opening in the housing 21. As the cam rotates the burner support 26 is moved vertically by pivoting of the lever and the resulting vertical motion of link 31. The shape and phase relation of the cam will be understood from the description of the machine's operation given hereinafter in connection with Fig. 10 wherein the various phases of the operating cycle are related to the degrees of rotation of the cam. The stroke of the link 31, which determines the distance through which the burner is moved, may be varied by adjusting along slot 95 in lever 34 a block 96 which carries pivot pin 33.

Journaled for rotation in the housing 21 on antifriction bearings 97 is an index drive shaft 98 which is driven by shaft 89 through gears 99 which provide a one-to-two reduction ratio. Secured to the upper end of shaft 98 is a plate 101 carrying two diametrically opposed rollers 102. During each half revolution of shaft 98 one of these rollers enters one of four equispaced radial slots 103 of an index driven plate 104. The latter is secured to hub 14 of turret 11, and hence for each complete revolution of shaft 89 the turret is advanced 90°. When neither of the rollers is in a slot 103 the turret is held against motion by seating of a lock dog 105 in one of four notches 106 in the periphery of plate 104. The lock dog is on one arm of a T-shaped lever 107 which is mounted upon an anti-friction bearing on a fulcrum pin 108 that is secured to housing 21. Another arm of the lever is engaged by a spring-backed plunger 109 which constantly urges the lock dog toward seated position, the plunger being supported by a bracket 111 on the housing. The third arm of the T-shaped lever carries a cam follower roller 112 which is adapted to ride on cam lobes 113 formed on the periphery of plate 101. There are two such lobes, so arranged as to lift the lock dog from a recess 106 just before a roller 102 enters into driving engagement in a slot 103 and to allow the spring-backed plunger 109 to seat the dog in a recess just after such driving engagement ends.

Also journaled in the housing 21, on anti-friction bearing 114, is a shaft 115 carrying control cams 116, 117, 118 and 119. Shaft 115 is driven by shaft 89 at a one-to-one ratio by gears 121. The control cams act through spring-backed plungers 122 to actuate limit switches 123, 124, 125 and 126 whose functions will be described hereinafter.

Other control devices for the machine comprise a pair of push-button switches 127 and 128, respectively for starting and stopping the machine, switch 127 normally being open and switch 128 normally being closed; a double switch having movable contacts 129 and 131 for rendering control of the solenoid operated oxygen and acetylene valves subject to either manual or automatic control; and a switch 132 for controlling the gas valve. All of these four switches are preferably mounted on a control column 133 at the front of the machine. Also on this column are a red signal lamp 134 to indicate whether the gas valves are turned on and a green signal lamp 135 to show whether the machine is functioning subject to the automatic cycle control means. The control devices further include a controller for burner-oscillating motor 78 having a winding OM and three contacts of which two, namely CM-1 and CM-2 are closed only when the winding is energized; and a controller for cycle motor 85 comprising a winding CM and three contacts of which two, namely CM-1 and CM-2 are closed only when the winding is energized, while the other, CM-3, is open only when the winding is deenergized. Contacts CM-2 and CM-3 respectively control the clutch activating winding 136 and the brake activating winding 137 of the clutch brake unit 86. The arrangement is such that whenever the motor 85 is energized the brake is released and the clutch engaged, and whenever the motor is deenergized the clutch is released and the brake applied so that the parts driven by the motor are stopped almost instantly despite the momentum of the motor. A rectifier 138 supplies direct current for the clutch and brake windings 136, 137.

Still further control apparatus comprises two adjustable time relays for controlling the duration of the heating and quenching phases of the cycle. The heating time relay comprises a winding HR and two movable contacts of which one, HR–1, opens, and the other, HR–2, closes, with a time delay after the winding is energized. The reverse position of the controls is assumed immediately upon deenergization of the winding. The quenching time relay also comprises a winding, QR, and two movable contacts, QR–1 and QR–2. Contact QR–1 opens immediately when the winding is deenergized and closed with a time delay after the winding is energized. The reverse is true of contact QR–2, which opens with a time delay after the winding is energized.

Figure 9:
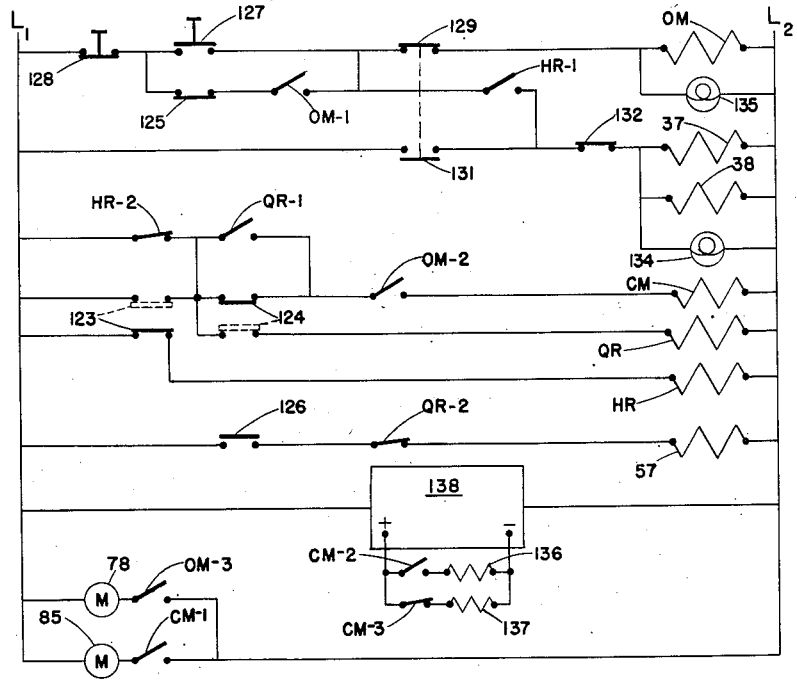
Fig. 9 is a wiring diagram of the machine.

Before operating the machine the pilot burner 47 is lighted and a master switch (not shown) is closed, thereby connecting leads L1 and L2, Fig. 9, to a suitable alternating current source. It will be assumed that the machine has previously stopped at the end of a normal operating cycle, position $a$ of cycle diagram, Fig. 10, which is the 0° or 360° position of cam 88. In this position switch 125 is held open by cam 118, while switches 123 and 124 are held respectively in the positions thereof shown in full lines in Fig. 9 by cams 116 and 117. Cam 88 is acting through lever 34 and rod 31 to hold the burner support in raised position. Relay winding HR is energized when the master switch is closed and, with a time delay, contact HR–1 opens and contact HR–2 closes.

To operate the machine automatically workpieces W are placed on the workholders 13 at stations A and B, switch contact 129 is closed (contact 131 opened), and gas control switch 132 is closed. The operator presses start switch button 127 thereby lighting green lamp 135 and energizing winding OM, causing contacts OM–1, OM–2 and OM–3 to close, the latter starting the burner oscillating motor 78. Closing of contact OM–2 energizes winding CM since the circuit for the latter is closed at contact HR–2 and at switch 124 (in its upper or full-line position). As a result contact CM–1 closes, starting the cycle motor 85. As soon as the latter rotates control cam shaft 115 slightly, the cam 118 closes switch 125, thereby establishing a holding shunt circuit (including now closed contact OM–1) around start switch 127 so that subsequent release of the latter by the operator has no effect.

When position $b$, Fig. 10, is reached one of rollers 102 is entering a slot 103 of plate 104, and therefore indexing of the turret is starting. When position $c$ is reached cam 116 shifts switch 123 (upwardly to its dotted position in Fig. 9). This deenergizes winding HR, immediately closing contact HR–1 and opening contact HR–2. The cycle motor 85 continues to operate because the switch 123 closes the breech in the circuit for winding CM which is caused by opening of contact HR–2. The closing of contact HR–1 completes the circuits through the oxygen and acetylene valve operating solenoids 37 and 38, opening the valves and so causing the burner 22 to light. A circuit is also completed through red lamp 134, warning the operator that burner 22 should have lighted. When position $d$ is reached the indexing action is completed and the workpieces at stations A and B have been advanced to stations B and C, respectively; and the cam 88 starts to lower the burner. At position $e$ the burner is fully lowered and heating of the workpiece is underway. At this time cam 116 allows switch 123 to return to its normal position, shown in full lines in Fig. 9. This deenergizes winding CM and thereby stops the cycle motor 85, for contact HR–2 is now open. Winding HR is energized, and, after a time delay during which the workpiece at station C is heated to the desired temperature, opens contact HR–1 and closes contact HR–2, thereby respectively causing the gas valves to close so that the burner is extinguished, and energizing controller winding CM to thereby restart the cycle motor 85.

When position $f$ is reached cam 119 closes limit switch 126, thereby completing the circuit through the solenoid 57 of the quench liquid valve, so that spray of the liquid from nozzle 23 is commenced; and shortly thereafter cam 88 begins to raise the burner and nozzle to quenching position. At $g$ this position is reached, and cam 117 moves switch 124 (downwardly to its dotted position in Fig. 9) to thereby open the circuit of controller winding CM, thereby stopping the cycle motor, and to simultaneously close the circuit through quench time relay winding QR. When the latter times out the contacts QR–1 and QR–2 respectively close and open, thereby energizing winding CM to restart the cycle motor and deenergizing solenoid 57 to shut off the flow of quenching fluid. At position $h$ cam 119 opens switch 126 and at position $j$ cam 117 allows switch 124 to return to its normal full line position in Fig. 9. This opens the circuit for relay QR so that immediately contact QR–1 opens and contact QR–2 closes. Due to the closing of switch 124 to shunt the contact QR–1 the cycle motor continues to operate until position $a$ is again reached. Then cam 118 opens switch 125, thereby breaking the circuit of controller winding OM with the result that contacts OM–1, OM–2 and OM–3 all open. Opening of contact OM–3 stops the oscillating motor 78 while opening of contact OM–2 deenergizes controller windings CM, causing contact CM–1 to open and the cycle motor 85 to stop.

During the heating and quenching phases of the cycle the operator may load another workpiece on the workholder at station A. If reloading is accomplished by the time the machine cycle is completed the latter may be restarted immediately by the operator pressing start button switch 127. Thus the machine may be kept in almost continuous operation. The operator can stop the machine at any time during its operation by pressing stop button switch 128. If he wishes to operate the machine through its cycle without lighting the gas burner he can do so by opening switch 132 and then pressing start button 127. Or he can operate the burner without running the machine by closing switch contact 131 (opening contact 129) and closing switch 132.

Having now described the machine which constitutes the preferred embodiment of our invention, and its mode of operation, what is claimed is:

1. A surface hardening machine comprising a support for a workpiece having a plurality of teeth arranged in a circle and whose tip faces lie approximately in a plane, a burner-carrying arm, a substantially ring-shaped burner on the arm and adapted to be in approximately parallel and concentric relation to such workpiece on the support, said burner being provided with means for directing a jet of flame against the tip face of each of said teeth of the workpiece, and means for effecting a relative motion between the support and the arm in a plane parallel to the aforementioned plane, said motion being such as to effect a relative translation of each of said jets in a closed path over the related tooth of the workpiece.

2. A machine according to claim 1 having a means for effecting relative motion between the support and the arm between a first position wherein the burner is adjacent the workpiece for heating the same and a second position wherein the burner is remote from the workpiece, and a quenching nozzle supported by the arm in substantially concentric relation to the burner and arranged to direct quenching fluid upon said tip faces of the teeth when in said second position.

3. A surface hardening machine comprising a frame, a burner-carrying arm, a link pivoted both to the frame and to the arm, for supporting the arm on the frame, a crank rotatable with respect to the frame and having its crank pin connected to the arm, and means for rotating said crank to thereby effect a translatory motion, in a substantially circular closed path, of a burner on the arm.

4. A surface hardening machine for substantially ring-shaped workpieces, comprising a frame, a turret rotatable on the frame and having a plurality of workholders thereon, indexing means for periodically advancing the turret rotatively to thereby successively advance the workholders from a loading station to a work station, a burner support and a gas burner carried thereby, the burner support being movable on the frame to carry the burner between a first position adjacent to a workpiece on the workholder at the work station and a second position remote therefrom, a nozzle for quenching fluid carried by the burner support and arranged to direct fluid onto the workpiece at the work station when the burner is in said second position, the nozzle extending into the central opening of workpiece at the work station when the burner is in said first position and being clear of the workpiece to permit indexing of the turret when the burner is in said second position, valve means for controlling the burner and other valve means for controlling flow of quenching fluid to the nozzle, and means operating in time with the indexing means for effecting the movement of the burner support and for controlling said valve means, whereby a workpiece is, in sequence, advanced to the work station, then heated by flame from the burner while the latter is in its first position and the valve means for the quenching fluid is closed, and then quenched by such fluid while the burner is in said second position and the valve means therefor is closed.

5. A surface hardening machine comprising a frame, a turret rotatable on the frame about a vertical axis and having a plurality of workholders thereon, indexing means for periodically advancing the turret rotatively to thereby successively move the workholders from a loading station to a work station, a burner support pivoted to the frame on a horizontal axis, an arm mounted on the support by a movable pivot, a burner and a quenching nozzle on the arm, means operable in time with the indexing means for swinging the support about said horizontal axis to alternately bring the burner and the nozzle into working relation to a workpiece at the work station, and means on the support for oscillating the arm about said movable pivot to thereby effect translation of the burner in a closed path relative to such workpiece.

6. A surface hardening machine comprising a circular burner body and a coolant nozzle disposed substantially centrally of said body for directing a spray of coolant onto a workpiece theretofore heated by the burner, said body having an annular gas passage therein and a plurality of burner nozzles communicating with said passage, an annular coolant chamber extending around and a central coolant chamber extending inside of said gas passage, at least one coolant inlet port opening into said annular chamber, at least one coolant passage extending from the annular chamber into the central chamber, and a coolant outlet port opening from the central chamber into the coolant nozzle.

References Cited in the file of this patent
UNITED STATES PATENTS

| | | |
|---|---|---|
| 2,247,494 | Hartley | July 1, 1941 |
| 2,268,528 | Somes | Dec. 30, 1941 |
| 2,294,161 | Crowe | Aug. 25, 1942 |
| 2,513,263 | Eytalis | June 27, 1950 |
| 2,678,818 | Rossbach | May 18, 1954 |